(12) United States Patent
Segawa et al.

(10) Patent No.: US 11,530,706 B2
(45) Date of Patent: Dec. 20, 2022

(54) ROTATING BODY, TURBOCHARGER, AND ROTATING BODY MANUFACTURING METHOD

(71) Applicant: IHI Corporation, Koto-ku (JP)

(72) Inventors: Kenichi Segawa, Tokyo (JP); Akitada Narimatsu, Tokyo (JP)

(73) Assignee: IHI Corporation, Koto-ku (JP)

( * ) Notice: Subject to any disclaimer, the term of this patent is extended or adjusted under 35 U.S.C. 154(b) by 442 days.

(21) Appl. No.: 16/545,277

(22) Filed: Aug. 20, 2019

(65) Prior Publication Data

US 2019/0376524 A1    Dec. 12, 2019

Related U.S. Application Data

(63) Continuation of application No. PCT/JP2018/011218, filed on Mar. 20, 2018.

(30) Foreign Application Priority Data

Mar. 22, 2017    (JP) .............................. JP2017-056117

(51) Int. Cl.
*F04D 29/26* (2006.01)
*F02C 5/06* (2006.01)
(Continued)

(52) U.S. Cl.
CPC ............ *F04D 29/266* (2013.01); *B23K 13/02* (2013.01); *F01D 5/025* (2013.01); *F02C 5/06* (2013.01);
(Continued)

(58) Field of Classification Search
CPC .......... F04D 29/266; F01D 5/025; F01D 5/06; F02C 7/36
See application file for complete search history.

(56) References Cited

U.S. PATENT DOCUMENTS 3,884,595 A * 5/1975 Herrick ................. F04D 29/266
416/198 R
4,872,817 A * 10/1989 De Kruif ................ F01D 5/025
417/407
(Continued)

FOREIGN PATENT DOCUMENTS

CA      2 420 970 A1    9/2003
CN      1443623 A       9/2003
(Continued)

OTHER PUBLICATIONS

Combined Chinese Office Action and Search Report dated May 9, 2020 in Chinese Patent Application No. 201880016534.X (with English translation and English translation of Category of Cited Documents), 17 pages.
(Continued)

*Primary Examiner* — Michael L Sehn
(74) *Attorney, Agent, or Firm* — Oblon, McClelland, Maier & Neustadt, L.L.P.

(57) ABSTRACT

Provided is a rotating body, including: a shaft; and a compressor impeller including: a main body having an insertion hole, which extends from one end to another end side and is configured to receive the shaft inserted therethrough; a boss portion formed at one end side of the main body; and a joint portion, which is formed on an inner peripheral surface of the insertion hole at the boss portion and is welded to the shaft.

12 Claims, 7 Drawing Sheets

(51) Int. Cl.
*F02C 7/36* (2006.01)
*B23K 13/02* (2006.01)
*F01D 5/02* (2006.01)

(52) U.S. Cl.
CPC ............ *F02C 7/36* (2013.01); *F05D 2220/40* (2013.01); *F05D 2230/232* (2013.01); *F05D 2230/60* (2013.01)

(56) References Cited

U.S. PATENT DOCUMENTS

| | | |
|---|---|---|
| 2003/0192879 A1 | 10/2003 | Yablochnikov |
| 2004/0126251 A1* | 7/2004 | Billington ............. F04D 29/266 417/407 |
| 2006/0021221 A1 | 2/2006 | Decker |
| 2008/0193296 A1* | 8/2008 | Takeda .................... F01D 5/048 416/223 A |
| 2009/0134147 A1 | 5/2009 | Gafri et al. |
| 2014/0356179 A1* | 12/2014 | Yagi ..................... F04D 29/284 416/223 R |
| 2015/0167695 A1* | 6/2015 | Saito ..................... F04D 29/662 29/888.024 |
| 2016/0097283 A1* | 4/2016 | Svihla ...................... F02C 6/12 417/407 |

FOREIGN PATENT DOCUMENTS

| | | |
|---|---|---|
| CN | 1309528 C | 4/2007 |
| CN | 101568401 A | 10/2009 |
| CN | 103946511 A | 7/2014 |
| CN | 104126075 A | 10/2014 |
| CN | 105683502 A | 6/2016 |
| CN | 105683525 A | 6/2016 |
| CN | 106246599 A | 12/2016 |
| EP | 1 342 530 A1 | 9/2003 |
| JP | 59-152101 U | 10/1984 |
| JP | 61-84101 U | 6/1986 |
| JP | 01-78730 U | 5/1989 |
| JP | 03-260330 A | 11/1991 |
| JP | 04-171298 A | 6/1992 |
| JP | 2004-034155 A | 2/2004 |
| JP | 2004-237348 A | 8/2004 |
| JP | 2006-037952 A | 2/2006 |
| JP | 2009-537327 A | 10/2009 |
| JP | 2014-202171 A | 10/2014 |
| WO | WO 2007/132468 A1 | 11/2007 |

OTHER PUBLICATIONS

International Search report dated Jun. 19, 2018 in PCT/JP2018/011218 filed Mar. 20, 2018 (with English Translation).

* cited by examiner

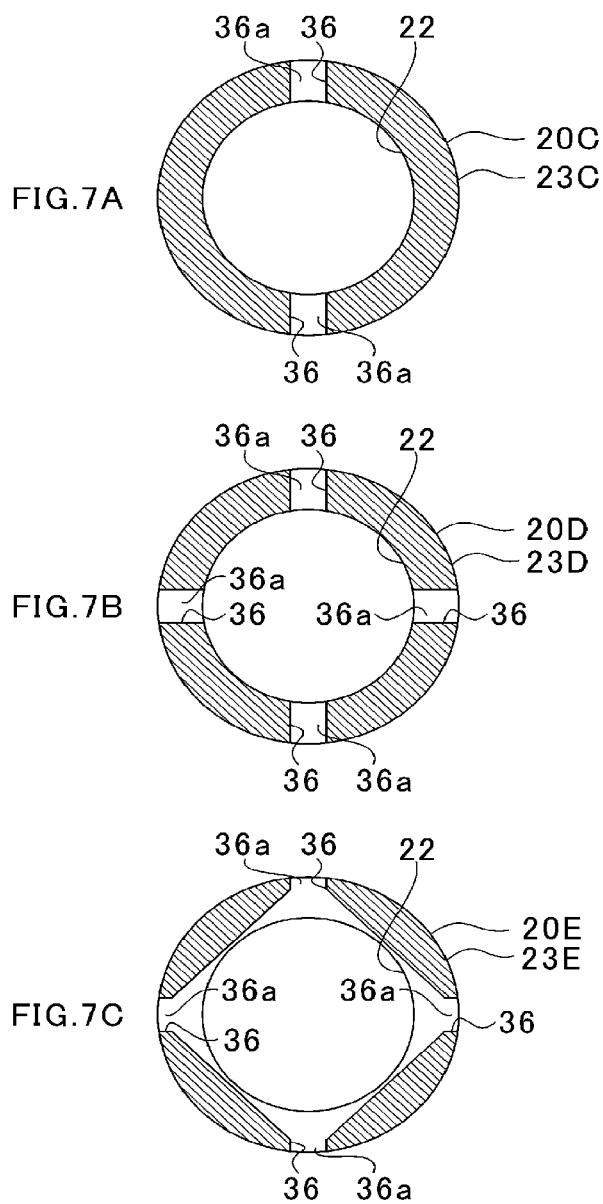

ROTATING BODY, TURBOCHARGER, AND ROTATING BODY MANUFACTURING METHOD

CROSS REFERENCE TO RELATED APPLICATIONS

This application is a continuation application of International Application No. PCT/JP2018/011218, filed on Mar. 20, 2018, which claims priority to Japanese Patent Application No. 2017-056117, filed on Mar. 22, 2017, the entire contents of which are incorporated by reference herein.

BACKGROUND ART

Technical Field

The present disclosure relates to a rotating body including a compressor impeller and a shaft, a turbocharger including the rotating body, and to a manufacturing method for a rotating body.

Related Art

Hitherto, there has been known a turbocharger in which a shaft is axially supported in a bearing housing so as to be freely rotatable. A turbine wheel is provided at one end of the shaft, and a compressor impeller is provided at another end of the shaft. The turbocharger is connected to an engine. In the turbocharger, the turbine wheel is rotated by exhaust gas discharged from the engine. The rotation of the turbine wheel causes the compressor impeller to rotate via the shaft. The turbocharger is configured to compress air in association with the rotation of the compressor impeller and send the compressed air to the engine.

For example, a compressor impeller disclosed in Patent Literature 1 has an insertion hole. A shaft is inserted through the insertion hole of the compressor impeller. The shaft has a step portion. The compressor impeller is held in abutment against the step portion of the shaft. A part of the shaft which projects from the insertion hole has a thread. The compressor impeller is sandwiched between a nut, which is threadedly engaged with the thread, and the step portion of the shaft. The compressor impeller is fixed to the shaft by an axial force applied by the nut.

CITATION LIST

Patent Literature

Patent Literature 1: Japanese Patent Application Laid-Open No. 2014-202171

SUMMARY

Technical Problem

With the above-mentioned configuration described in Patent Literature 1, it is difficult to manage the axial force. Therefore, there has been a demand for development of a rotating body which can be easily manufactured, a turbocharger, and a manufacturing method for a rotating body.

The present disclosure has an object to provide a rotating body which can be easily manufactured, a turbocharger, and a manufacturing method for a rotating body.

Solution to Problem

In order to solve the problem described above, according to one embodiment of the present disclosure, there is provided a rotating body, including: a shaft; and a compressor impeller including: a main body having an insertion hole, the insertion hole extending from one end to another end side and being configured to receive the shaft inserted therethrough; a boss portion formed at one end side of the main body; and a joint portion, which is formed on an inner peripheral surface of the insertion hole at the boss portion, and is welded to the shaft.

The insertion hole includes: a small-inner-diameter portion formed on the another end side with respect to the boss portion; and a radially expanded portion, which is located between the small-inner-diameter portion and the joint portion, and has an inner diameter larger than an inner diameter of the small-inner-diameter portion.

The compressor impeller includes: blades which are provided at the another end side with respect to the boss portion on an outer periphery of the main body; and an extending portion, which is located between the blades and the boss portion, and has a thickness in the radial direction larger than that of the boss portion.

The shaft includes: a small-diameter portion welded to the joint portion; a large-diameter portion, which is formed on the another end side with respect to the small-diameter portion, and has a diameter larger than that of the small-diameter portion; and a step portion extending from the small-diameter portion to the large-diameter portion.

The boss portion is divided into a plurality of segments in the circumferential direction.

In order to solve the problem described above, according to one embodiment of the present disclosure, a turbocharger includes a rotating body.

In order to solve the problem described above, according to one embodiment of the present disclosure, there is provided a manufacturing method for a rotating body, including: inserting a shaft through an insertion hole extending from one end to another end side of a main body of a compressor impeller; and joining a boss portion, which is formed at one end of the main body, and the shaft by electromagnetic forming.

Effects of Disclosure

According to the present disclosure, a rotating body can be easily manufactured.

BRIEF DESCRIPTION OF DRAWINGS

FIG. 7A is a sectional view of a boss portion in a fourth modification example.
FIG. 7B is a sectional view of a boss portion in a fifth modification example.

FIG. 7C is a sectional view of a boss portion in a sixth modification example.

DESCRIPTION OF EMBODIMENT

Figure 1:
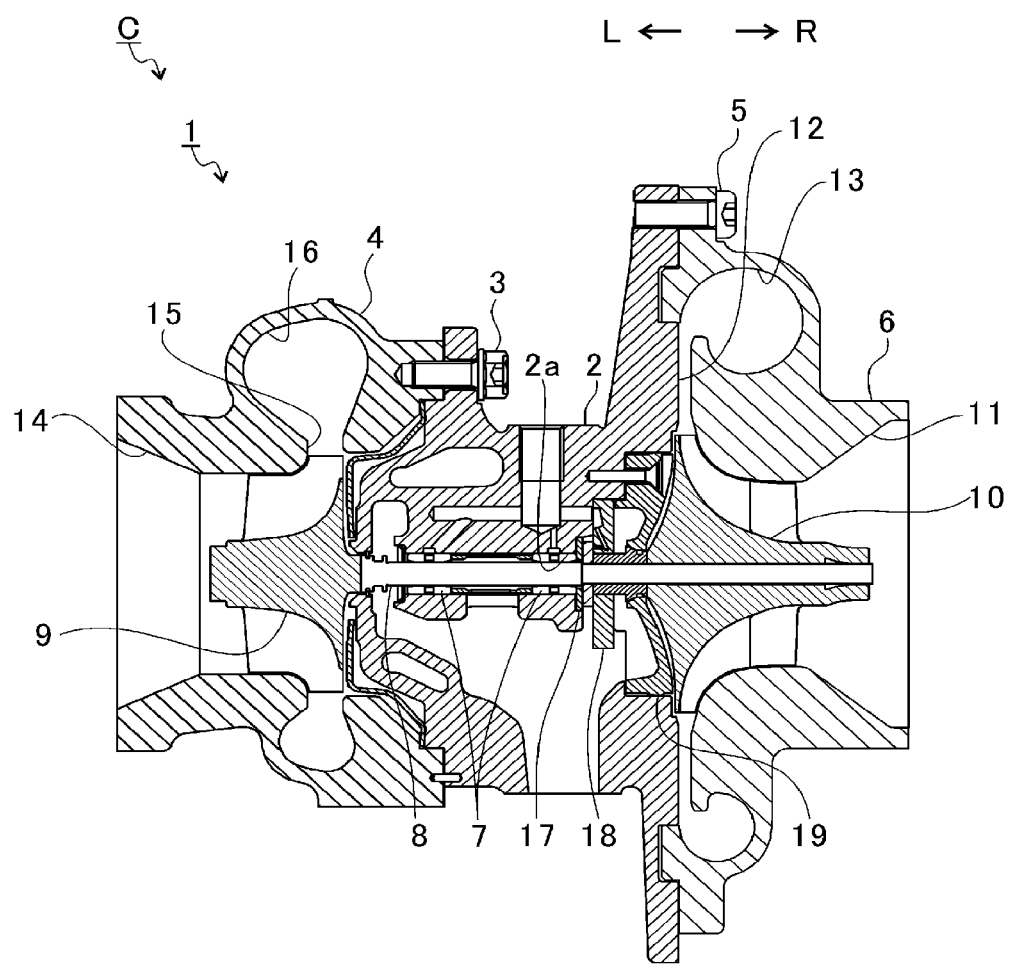
FIG. 1 is a schematic sectional view of a turbocharger.

Now, with reference to the attached drawings, an embodiment of the present disclosure is described in detail. The dimensions, materials, and other specific numerical values represented in the embodiment are merely examples used for facilitating the understanding of the present disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following, a direction indicated by the arrow L illustrated in FIG. 1 is described as a left side of the turbocharger C. A direction indicated by the arrow R illustrated in FIG. 1 is described as a right side of the turbocharger C. As illustrated in FIG. 1, the turbocharger C includes a turbocharger main body 1. The turbocharger main body 1 includes a bearing housing 2. A turbine housing 4 is coupled to the left side of the bearing housing 2 by a fastening bolt 3. A compressor housing 6 is coupled to the right side of the bearing housing 2 by a fastening bolt 5.

The bearing housing 2 has a bearing hole 2a. The bearing hole 2a passes through the turbocharger C in the right-and-left direction. Radial bearings 7 are provided in the bearing hole 2a. In FIG. 1, illustration is given of full-floating bearings as one example of the radial bearings 7. However, the radial bearings 7 may be other radial bearings such as semi-floating bearings or rolling bearings. The shaft 8 is axially supported by the radial bearings 7 so as to be freely rotatable. A turbine wheel 9 is provided at a left end portion of the shaft 8. The turbine wheel 9 is accommodated in the turbine housing 4 so as to be freely rotatable. Moreover, a compressor impeller 10 is provided at a right end portion of the shaft 8. The compressor impeller 10 is accommodated in the compressor housing 6 so as to be freely rotatable.

The compressor housing 6 has a suction port 11. The suction port 11 is opened on the right side of the turbocharger C. The suction port 11 is connected to an air cleaner (not shown). A diffuser flow passage 12 is defined on a radially outer side of the suction port 11. The diffuser flow passage 12 is defined by opposed surfaces of the bearing housing 2 and the compressor housing 6. The diffuser flow passage 12 is configured to increase the pressure of the air. The diffuser flow passage 12 is defined so as to have an annular shape extending from an inner side toward an outer side in the radial direction of the shaft 8. The diffuser flow passage 12 communicates to the suction port 11 through intermediation of the compressor impeller 10.

The compressor housing 6 has a compressor scroll flow passage 13. The compressor scroll flow passage 13 is defined so as to have an annular shape. For example, the compressor scroll flow passage 13 is located on an outer side in the radial direction of the shaft 8 with respect to the diffuser flow passage 12. The compressor scroll flow passage 13 communicates to a suction port of an engine (not shown). The compressor scroll flow passage 13 communicates also to the diffuser flow passage 12. When the compressor impeller 10 rotates, air is breathed into the compressor housing 6 through the suction port 11. The air having been breathed is pressurized and accelerated by an action of a centrifugal force in a course of flowing through blades of the compressor impeller 10. The air having been pressurized and accelerated is increased in pressure in the diffuser flow passage 12 and the compressor scroll flow passage 13. The air having been increased in pressure is guided to the suction port of the engine.

The turbine housing 4 has a discharge port 14. The discharge port 14 is opened on the left side of the turbocharger C. The discharge port 14 is connected to an exhaust gas purification device (not shown). The turbine housing 4 has a flow passage 15 and a turbine scroll flow passage 16. The turbine scroll flow passage 16 is defined so as to have an annular shape. For example, the turbine scroll flow passage 16 is located on the radially outer side of the turbine wheel 9 with respect to the flow passage 15. The turbine scroll flow passage 16 communicates to a gas inflow port (not shown). Exhaust gas discharged through a discharge manifold of the engine (not shown) is guided to the gas inflow port. The exhaust gas having been guided to the turbine scroll flow passage 16 through the gas inflow port is guided to the discharge port 14 through the flow passage 15 and the turbine wheel 9.

The turbine wheel 9 rotates in a course of flow of the exhaust gas from the flow passage 15 to the discharge port 14. A rotational force of the turbine wheel 9 is transmitted to the compressor impeller 10 via the shaft 8. The rotational force of the compressor impeller 10 causes the air having been increased in pressure to be guided to the suction port of the engine.

A turbine-side bearing 17 and a compressor-side bearing 18 are provided in the bearing housing 2. The turbine-side bearing 17 has a through hole configured to receive the shaft 8 inserted therethrough. The compressor-side bearing 18 has a through hole configured to receive the shaft 8 inserted therethrough. The turbine-side bearing 17 is provided at an opening of the bearing hole 2a. The compressor-side bearing 18 is provided on the compressor impeller 10 side with respect to the turbine-side bearing 17. The compressor-side bearing 18 is separated apart from the turbine-side bearing 17 in the axial direction of the shaft 8 (hereinafter simply referred to as "axial direction"). A seal plate 19 is provided between the compressor-side bearing 18 and the compressor impeller 10. The seal plate 19 is mounted to the bearing housing 2.

Figure 2:
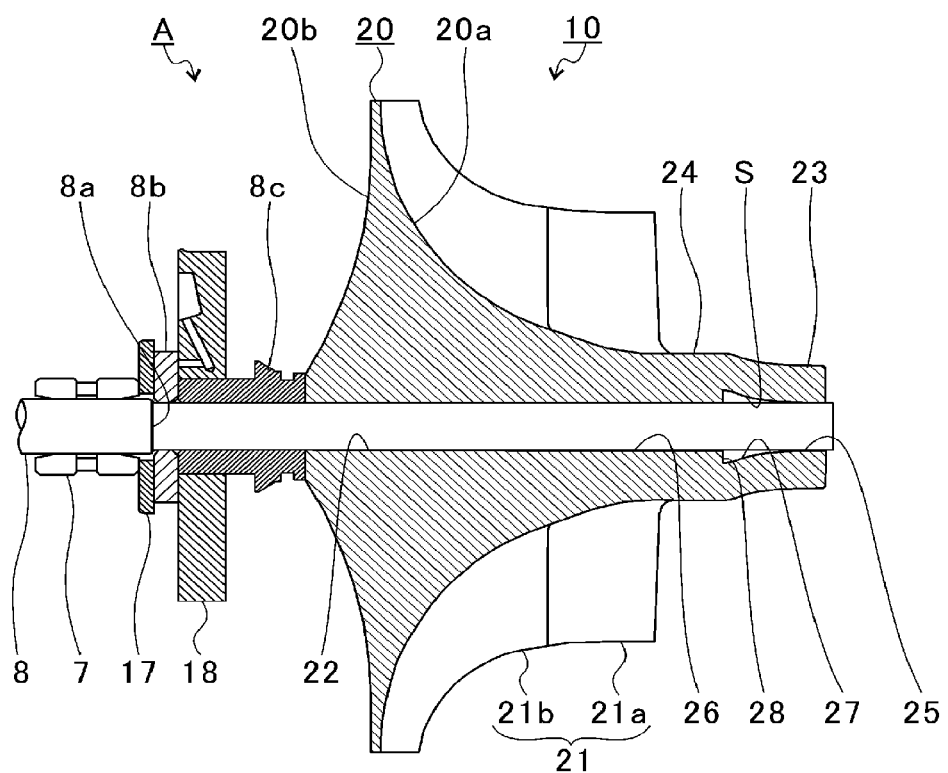
FIG. 2 is a partial enlarged view of a rotating body.

FIG. 2 is a partial enlarged view of the rotating body A. In FIG. 2, illustration is given of the rotating body A, the radial bearing 7, the turbine-side bearing 17, and the compressor-side bearing 18. The rotating body A includes at least the shaft 8 and the compressor impeller 10 of, for example, a radial type. The shaft 8 has an abutment surface 8a. In the shaft 8, an outer diameter thereof on the compressor impeller 10 side is smaller than an outer diameter thereof on the turbine wheel 9 side over the abutment surface 8a as a boundary. That is, the abutment surface 8a is formed by an outer diameter difference of the shaft 8.

The abutment surface 8a is an annular flat surface facing the compressor impeller 10 side. A collar 8b provided to the shaft 8 is held in abutment against the abutment surface 8a. The collar 8b is held in abutment against the abutment surface 8a from the compressor impeller 10 side. The collar 8b is located between the turbine-side bearing 17 and the compressor-side bearing 18. The collar 8b rotates integrally with the shaft 8. The collar 8b is opposed to the turbine-side bearing 17 and the compressor-side bearing 18 in the axial direction. Lubricating oil is supplied to a gap between the collar 8b and the turbine-side bearing 17. Lubricating oil is supplied to a gap between the collar 8b and the compressor-side bearing 18. When the rotating body A moves in the axial direction, a thrust load acts on the turbine-side bearing 17 or the compressor-side bearing 18 via the collar 8b. That is, the turbine-side bearing 17 and the compressor-side bearing 18 function as thrust bearings.

An oil thrower member 8c having a cylindrical shape is provided between the collar 8b and the compressor impeller 10. The shaft 8 is inserted through the oil thrower member 8c. The oil thrower member 8c has one end in contact with the compressor impeller 10 and has another end in contact with the collar 8b. In the oil thrower member 8c, an outer diameter thereof on the collar 8b side is smaller than an inner diameter of a through hole of the compressor-side bearing 18. The collar 8b side of the oil thrower member 8c is inserted through the through hole of the compressor-side bearing 18. In the oil thrower member 8c, an outer diameter thereof on the compressor impeller 10 side is larger than an inner diameter of the through hole of the compressor-side bearing 18. The oil thrower member 8c causes the lubricating oil, which flows from the through hole of the compressor-side bearing 18 toward the compressor impeller 10, is caused to scatter radially outward with a centrifugal force.

The compressor impeller 10 includes a main body 20. The main body 20 has such a shape of being radially expanded from the right side toward the left side in FIG. 2 in the axial direction. In the main body 20, an outer peripheral surface 20a faces one side in the axial direction (right side in FIG. 2), and a back surface 20b faces another side in the axial direction (left side in FIG. 2).

The outer peripheral surface 20a of the main body 20 is gradually increased in outer diameter toward the another side in the axial direction. For example, the back surface 20b of the main body 20 is gradually increased in outer diameter toward the one side in the axial direction. The outer peripheral surface 20a includes a plurality of blades 21 which are separated apart from each other in a rotation direction of the shaft 8 (hereinafter simply referred to as "rotation direction" or "circumferential direction"). The blades 21 project in the radial direction from the outer peripheral surface 20a of the main body 20. The blades 21 include long blades 21a and short blades 21b. The long blades 21a extend longer than the short blades 21b in the axial direction. In other words, the long blades 21a project toward one side (right side in FIG. 2) with respect to the short blades 21b. The long blades 21a and the short blades 21b are provided alternately in the rotation direction.

The main body 20 of the compressor impeller 10 has an insertion hole 22. The insertion hole 22 is formed (extends) from one end (end portion on the right side in FIG. 2) of the main body 20 toward another end side (end portion side on the left side in FIG. 2). The insertion hole 22 passes through the main body 20 from the one end to the another end. The shaft 8 is inserted through the insertion hole 22.

A boss portion 23 is formed on one end side (right side in FIG. 2) of the main body 20. The boss portion 23 is a part of the main body 20, which projects toward one side in the axial direction with respect to the blades 21 (long blades 21a). In other words, the blades 21 are provided on the another end side with respect to the boss portion 23 on an outer periphery of the main body 20. The boss portion 23 is separated apart from the blades 21 in the axial direction. The main body 20 includes an extending portion 24. The extending portion 24 is a part located between the blades 21 (long blades 21a) and the boss portion 23. The extending portion 24 has a thickness in the radial direction larger than that of the boss portion 23. In other words, the boss portion 23 has a thickness in the radial direction smaller than that of the extending portion 24.

The outer peripheral surface 20a of the main body 20 is gradually reduced in diameter toward one side in the axial direction (right side in FIG. 2). In the extending portion 24, a diameter of the outer peripheral surface 20a is approximately constant or is gently reduced toward one side in the axial direction (right side in FIG. 2). In the outer peripheral surface 20a at the boss portion 23, an outer diameter on one end side of the main body 20 (right side in FIG. 2) is smaller than an outer diameter on another end side (left side in FIG. 2). For example, the boss portion 23 is tapered off toward the one end side (right side in FIG. 2) of the main body 20. A joint portion 25 is formed on an inner peripheral surface of the insertion hole 22 at the boss portion 23. The joint portion 25 is a part at which the main body 20 (boss portion 23) and the shaft 8 are welded to each other. That is, the joint portion 25 is formed over both the main body 20 (boss portion 23) and the shaft 8.

The insertion hole 22 includes a small-inner-diameter portion 26 and a radially expanded portion 27 on another end side of the main body 20 (left side in FIG. 2) with respect to the joint portion 25 described above. The small-inner-diameter portion 26 is formed on another end side (left side in FIG. 2) of the main body 20 with respect to the boss portion 23. That is, the small-inner-diameter portion 26 is located on a radially inner side of the blades 21 and the extending portion 24. The radially expanded portion 27 is located between the small-inner-diameter portion 26 and the joint portion 25. The radially expanded portion 27 extends from the small-inner-diameter portion 26 to the joint portion 25. The radially expanded portion 27 has an inner diameter larger than that of the small-inner-diameter portion 26. The radially expanded portion 27 has a maximum inner diameter on the small-inner-diameter portion 26 side, and the inner diameter is gradually reduced toward the joint portion 25 side. The radially expanded portion 27 has a tapered shape, which is gradually reduced in inner diameter on the joint portion 25 side.

A step surface 28 extending in the radial direction is formed in the insertion hole 22. The step surface 28 is located at a boundary portion between the boss portion 23 and the extending portion 24. In other words, the boss portion 23 and the extending portion 24 have a boundary therebetween at the step surface 28. The step surface 28 is formed by an inner diameter difference between the small-inner-diameter portion 26 and an end portion of the radially expanded portion 27 on the small-inner-diameter portion 26 side. A difference in thickness in the radial direction between the boss portion 23 and the extending portion 24 is approximately equal to an inner radius difference between the small-inner-diameter portion 26 and the end portion of the radially expanded portion 27 on the small-inner-diameter portion 26 side. That is, a difference between the boss portion 23 and the extending portion 24 in thickness in the radial direction is approximately equal to a width of the step surface 28 in the radial direction. With the radially expanded portion 27, a space S is defined inside the boss portion 23.

Figure 3A:
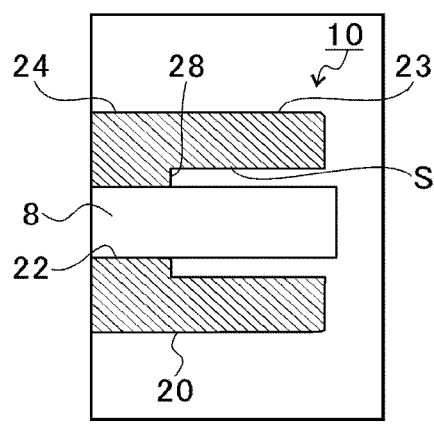
FIG. 3A is an illustration of a shaft and a compressor impeller before being joined to each other.
Figure 3B:
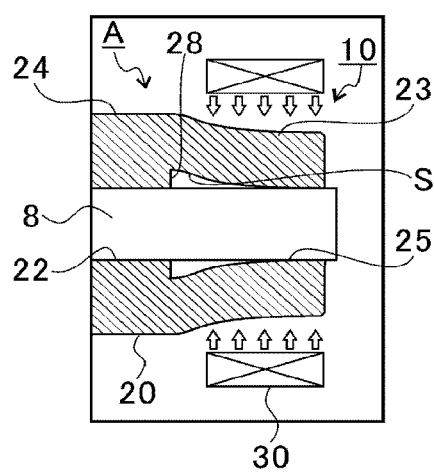
FIG. 3B is an illustration of the shaft and the compressor impeller after being joined to each other.
Figure 3C:
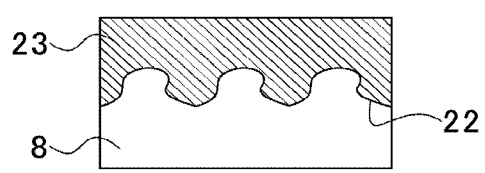
FIG. 3C is a partial enlarged view of a joint surface between the shaft and the compressor impeller.

Next, description is made of a method of assembling the rotating body A described above. FIG. 3A is an illustration of the shaft 8 and the compressor impeller 10 before being joined to each other. FIG. 3B is an illustration of the shaft 8 and the compressor impeller 10 after being joined to each other. FIG. 3C is a partial enlarged view of a joint surface between the shaft 8 and the compressor impeller 10. In FIG. 3C, illustration of the joint surface between the shaft 8 and the compressor impeller 10 is simplified. As illustrated in FIG. 3A, in a state before the shaft 8 and the compressor impeller 10 are joined to each other, the boss portion 23 is separated apart from the shaft 8 in the radial direction. That is, an inner diameter of the insertion hole 22 at the boss portion 23 is equal to an outer diameter of the step surface 28, and is approximately constant from one side to another side in the axial direction. The boss portion 23 has a bottomed cylindrical shape with the step surface 28 as a bottom part. The boss portion 23 has the space S opened on one end side of the main body 20.

In an assembling step, the radial bearing 7, the shaft 8, the collar 8b, the oil thrower member 8c, the turbine wheel 9, the compressor-side bearing 18, and the seal plate 19 are assembled to the bearing housing 2 by a predetermined procedure. After that, the shaft 8 is inserted through the insertion hole 22 of the compressor impeller 10.

The collar 8b is held in abutment against the abutment surface 8a. The oil thrower member 8c is in contact with the collar 8b. Another end of the compressor impeller 10 is in contact with the oil thrower member 8c. That is, the collar 8b and the oil thrower member 8c are sandwiched between the abutment surface 8a and the compressor impeller 10. At this time, the compressor impeller 10 is pressed toward the oil thrower member 8c side with a jig (not shown). Moreover, on this occasion, one end of the shaft 8 is pulled with a jig (not shown).

In this state, as illustrated in FIG. 3B, the boss portion 23 is inserted into a coil 30. When a large current flows through the coil 30, a magnetic flux and an eddy current flow to the boss portion 23 by electromagnetic induction. Electromagnetic forces repel each other between the coil 30 and the boss portion 23 so that the electromagnetic force imparted radially inward to the boss portion 23 (indicated by outlined arrows in FIG. 3B) act. The boss portion 23 is radially contracted at high speed in a sequential manner from the one end side of the shaft 8 (right side in FIG. 3B) toward the another end side of the shaft 8 (left side in FIG. 3B). An inner peripheral surface of the insertion hole 22 at the boss portion 23 collides with an outer peripheral surface of the shaft 8 at high speed. As a result, the boss portion 23 is deformed with viscoplasticity of a material thereof, thereby being welded (joined) in the radial direction of the shaft 8. The joint portion 25 is formed on the inner peripheral surface of the insertion hole 22 at the boss portion 23. In this case, the joint surface of the welded portion (outer peripheral surfaces of the joint portion 25 and the shaft 8) is formed into, for example, a corrugated shape due to a behavior of the viscoplasticity as illustrated in FIG. 3C.

As described above, in the assembling step for the rotating body A, the shaft 8 is inserted through the insertion hole 22 formed in the compressor impeller 10. Then, the boss portion 23, which is formed at one end of the main body 20, and the shaft 8 are welded (joined) to each other by electromagnetic forming. In the related art, the compressor impeller 10 is fastened to the shaft 8 by a nut. In the assembling step having hitherto been employed, it is required that the axial force be strictly managed. When the compressor impeller 10 is to be welded to the shaft 8, in the assembling step, it is only required that an axial force which prevents rotation of the collar 8b and the oil thrower member 8c be applied. Management of the axial force becomes extremely easier. As a result, the rotating body A and the turbocharger C can easily be manufactured. Moreover, in the assembling step having hitherto been employed, the axial force for holding the compressor impeller 10 with respect to the shaft 8 significantly varies, with the result that the rotation number is limited. With the rotating body A according to the embodiment, the variation of the axial force for holding the compressor impeller 10 with respect to the shaft 8 is small, thereby being capable of meeting the demand for increase in speed. Moreover, when the boss portion 23 and the shaft 8 are welded (joined) to each other in the radial direction, as compared to the case in which the boss portion 23 and the shaft 8 are welded (joined) in the axial direction, a high degree of freedom in design, such as increase in a welding (joining) area in an easy manner, can be secured. Moreover, when the boss portion 23 and the shaft 8 are welded (joined) to each other in the radial direction, as compared to the case in which the boss portion 23 and the shaft 8 are welded (joined) to each other in the axial direction, a space for arranging a jig at the time of welding (joining) can easily be secured. Therefore, operability is improved.

In this case, the extending portion 24 is formed between the blades 21 and the boss portion 23. In general, in the turbocharger C, balance adjustment is performed after assembly of the rotating body A. In the related-art configuration in which the compressor impeller 10 is fastened to the shaft 8 with a nut, the balance adjustment is performed by grinding the nut. The extending portion 24 has a thickness larger than that of the boss portion 23. Therefore, in the rotating body A, the extending portion 24 can be used for the balance adjustment. However, the extending portion 24 is not essentially required.

Herein, as one example, description is made of the case in which the joint portion 25 is formed by the electromagnetic forming. However, the joint portion 25 may be formed by other joining processing such as explosive bonding. Moreover, for example, at the time of assembling the compressor impeller 10 to the shaft 8, the electromagnetic bonding described above and shrink fitting may be used in combination. In this case, it is preferred that the range of shrink fitting be set at a part of the small-inner-diameter portion 26 on the oil thrower member 8c side. In the small-inner-diameter portion 26, the part on the oil thrower member 8c side and a part of the shaft 8 which is opposed to the part of the small-inner-diameter portion 26 (part of the small-inner-diameter portion 26 on the oil thrower member 8c side) in the radial direction have a dimensional relationship achieving interference fitting. That is, an outer diameter of the part of the shaft 8 on the oil thrower member 8c is larger than an inner diameter of the insertion hole 22 opposed to the part of the shaft 8 (part of the shaft 8 on the oil thrower member 8c side) in the radial direction. The shaft 8 is inserted into the insertion hole 22 of the compressor impeller 10 with the main body 20 having been warmed, and one end side of the shaft 8 is pulled. When the main body 20 is cooled, the insertion hole 22 is radially contracted, and hence the compressor impeller 10 is brought into pressure contact with the shaft 8. After that, in a manner similar to that described above, the boss portion 23 is joined to the shaft 8 by the electromagnetic forming. With the combination of the electromagnetic forming and the shrink fitting, the compressor impeller 10 can be more rigidly assembled to the shaft 8.

Figure 4:
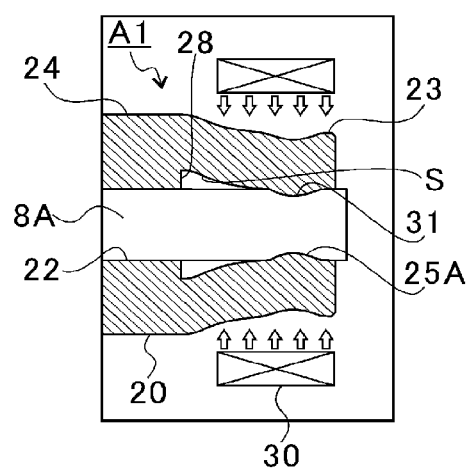
FIG. 4 is an extraction view for illustrating a part corresponding to FIG. 3B in a first modification example.

FIG. 4 is an extraction view for illustrating a part corresponding to FIG. 3B in a first modification example. In the first modification example, a rotating body A1 is provided in place of the rotating body A according to the embodiment described above. Configurations other than the rotating body A1 are the same as those described above. Configurations which are the same as those described above are denoted by the same reference symbols, and detailed description is omitted. The rotating body A1 includes a shaft 8A. The shaft 8A has an annular groove 31 formed in an outer peripheral surface on one end side. The annular groove 31 is a groove extending in the circumferential direction.

The annular groove 31 is located on a radially inner side of the boss portion 23. In an assembling step for the rotating body A1, for example, the electromagnetic forming is performed in a manner similar to that described above. In this case, a joint portion 25A is formed on an inner peripheral surface of the insertion hole 22 at the boss portion 23. The joint portion 25A bites into the annular groove 31 of the shaft 8A. That is, the boss portion 23 is caulked with respect to the shaft 8A at the joint portion 25A.

In the first modification example, description is made of the case in which the annular groove 31 is formed. However, on the outer peripheral surface of the shaft 8A, there may be formed, in place of the annular groove 31, an annular projection extending in the circumferential direction. Moreover, there may be formed, in place of the annular groove 31, a spline-shaped groove extending in the axial direction. In the outer peripheral surface of the shaft 8A, there may be formed grid-shaped grooves formed of a plurality of grooves intersecting one another. Moreover, on the outer peripheral surface of the shaft 8A, the annular groove 31 and the annular projection may be omitted, and the inner peripheral surface of the insertion hole 22 at the boss portion 23 may be press-joined to the outer peripheral surface of the shaft 8A. In any of those cases, for example, when the boss portion 23 extends over the circumferential direction, a press-joining force is likely to be generated. On the inner peripheral surface of the insertion hole 22 at the boss portion 23, there is formed the joint portion 25A. The joint portion 25A may be welded or not welded to the shaft 8A.

Figure 5:
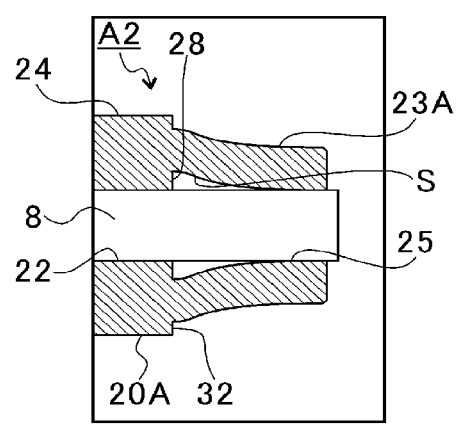
FIG. 5 is an extraction view for illustrating a part corresponding to FIG. 3B in a second modification example.

FIG. 5 is an extraction view for illustrating a part corresponding to FIG. 3B in a second modification example. In the second modification example, a rotating body A2 is provided in place of the rotating body A according to the embodiment described above. Configurations other than the rotating body A2 are the same as those described above. Configurations which are the same as those described above are denoted by the same reference symbols, and detailed description is omitted. The compressor impeller 10 of the rotating body A2 includes a main body 20A. The main body 20A has a boss portion 23A formed at one end. The extending portion 24 is formed on another end side of the boss portion 23A. An abutting surface 32 is formed between the outer peripheral surface of the boss portion 23A and the outer peripheral surface of the extending portion 24. The abutting surface 32 is an annular flat surface extending in the radial direction and the circumferential direction. An outer diameter of the boss portion 23A is, for example, smaller than an outer diameter of the extending portion 24 by a thickness of the abutting surface 32 in the radial direction. The abutting surface 32 is formed at a base end of the boss portion 23A.

When the main body 20A and the shaft 8 are to be joined to each other, one end of the shaft 8 is pulled toward one side in the axial direction (right side in FIG. 5) with a jig (not shown). In this state, the jig is pressed against the abutting surface 32, and the main body 20A is pressed toward another side in the axial direction (left side in FIG. 5). With the main body 20A being pressed, the abutment surface 8a, the collar 8b, and the oil thrower member 8c of the shaft 8 as well as the compressor impeller 10 are brought into contact with one another in the axial direction. In this state, the joint portion 25 is formed by, for example, the electromagnetic forming, and the boss portion 23A is joined (welded) to the shaft 8. With the abutting surface 32 formed at the base end of the boss portion 23A, the boss portion 23A is appropriately held at the time of joining, thereby improving accuracy in joining.

Figure 6:
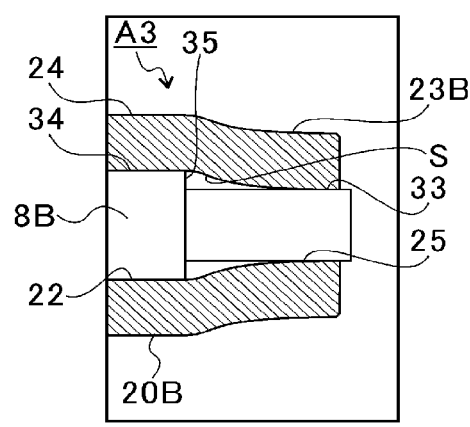
FIG. 6 is an extraction view for illustrating a part corresponding to FIG. 3B in a third modification example.

FIG. 6 is an extraction view for illustrating a part corresponding to FIG. 3B in a third modification example. In the third modification example, a rotating body A3 is provided in place of the rotating body A according to the embodiment described above. Configurations other than the rotating body A3 are the same as those described above. Configurations which are the same as those described above are denoted by the same reference symbols, and detailed description is omitted. The compressor impeller 10 of the rotating body A3 includes a main body 20B. The main body 20B has a boss portion 23B formed at one end. The extending portion 24 is formed on another end side of the boss portion 23B. The boss portion 23B and the extending portion 24 have thicknesses in the radial direction which are approximately equal to each other.

The rotating body A3 includes a shaft 8B. The shaft 8B includes a small-diameter portion 33 at one end thereof. The shaft 8B includes a large-diameter portion 34 on another end side with respect to the small-diameter portion 33. The large-diameter portion 34 has a diameter larger than that of the small-diameter portion 33. A step portion 35 is formed between the small-diameter portion 33 and the large-diameter portion 34. The step portion 35 extends from the small-diameter portion 33 to the large-diameter portion 34. The step portion 35 is an annular flat surface extending in the radial direction and the circumferential direction.

In the rotating body A3, the boss portion 23B of the main body 20B is joined to the shaft 8B. Before the boss portion 23B and the shaft 8B are joined to each other, an inner diameter of the insertion hole 22 is approximately equal from one end side to another end side. An inner diameter of the insertion hole 22 is approximately equal to a diameter of the large-diameter portion 34 of the shaft 8B, or is slightly larger than a diameter of the large-diameter portion 34. Thus, a space S is defined between the inner peripheral surface of the insertion hole 22 at the boss portion 23B and the outer peripheral surface of the small-diameter portion 33. In a manner similar to that described above, when the electromagnetic forming is performed on the boss portion 23B, the joint portion 25 is formed on the inner peripheral surface of the insertion hole 22 at the boss portion 23B. Under a state in which the boss portion 23B and the shaft 8B are joined to each other, an inner diameter of the insertion hole 22 is smaller on a side closer to the joint portion 25.

The rotating body A of the embodiment described above has a step in the insertion hole 22 of the main body 20. Also in a case in which the step is formed in the shaft 8B as in the case of the rotating body A3 of the third modification example, an action similar to that of the embodiment described above is achieved.

FIG. 7A is a sectional view of a boss portion 23C in a fourth modification example. In the fourth modification example, the boss portion 23C is different from the boss portion 23 of the embodiment described above. Similarly to the description above, the boss portion 23C is joined to the shaft 8. In FIG. 7A, there is illustrated a state before the boss portion 23C and the shaft 8 are joined to each other. The boss portion 23C of the fourth modification example has two slits 36. The slits 36 passes from the inner peripheral surface of the insertion hole 22 to the outer peripheral surface of the boss portion 23C. The slits 36 extend in the axial direction. However, a length and a width of the slits 36 are not particularly limited. For example, the slits 36 may be formed within a range of the boss portion 23C, or may extend to the extending portion 24. In the fourth modification example, the two slits 26 are arranged opposed to each other at positions shifted by 180 degrees in the circumferential direction.

FIG. 7B is a sectional view of a boss portion 23D in a fifth modification example. Similarly to the description above, the boss portion 23D is joined to the shaft 8. In FIG. 7B, illustration is given of a state before the boss portion 23D and the shaft 8 are joined to each other. The boss portion 23D of the fifth modification example has two more slits 36 as compared to the boss portion 23C of the fourth modification example. The boss portion 23D has four slits 36 which are formed at positions shifted by 90 degrees in the circumferential direction. Also in the fifth modification example, a length and a width of the slits 36 in the axial direction are not particularly limited.

FIG. 7C is a sectional view of a boss portion 23E in a sixth modification example. Similarly to the description above, the boss portion 23E is joined to the shaft 8. In FIG. 7C, illustration is given of a state before the boss portion 23E and the shaft 8 are joined to each other. The boss portion 23E of the sixth modification example has a rectangular sectional shape as compared to the boss portion 23D of the fifth modification example. That is, the boss portion 23E is partially different in thickness in the radial direction. The boss portion 23E is divided by the slits 36 into four segments in the circumferential direction. The four divided segments of the boss portion 23E are each increased in thickness in the radial direction as extending from both end sides toward a center side in the circumferential direction.

According to the fourth to sixth modification examples described above, the joint portion 25 to be joined to the shaft 8 is formed on the boss portion 23C, 23D, 23E. The boss portion 23C, 23D, 23E having the joint portion 25 is divided by the slits 36 into a plurality of segments in the circumferential direction. When the main body 20C, 20D, 20E and the shaft 8 are to be joined to each other, one end of the shaft 8 is pulled toward one side in the axial direction (close side on the drawing sheets in FIG. 7A, FIG. 7B, and FIG. 7C) with a jig (not shown). In this state, a jig (not shown) is pressed against a bottom surface 36a of the slit 36 on another side in the axial direction (far side on the drawing sheets in FIG. 7A, FIG. 7B, and FIG. 7C), and the main body 20C, 20D, 20E is pressed toward another side in the axial direction. The boss portion 23C, 23D, 23E is appropriately held at the time of joining, thereby improving accuracy in joining. Moreover, the boss portion 23C, 23D, 23E is divided in the circumferential direction, and hence is likely to be radially contracted at the time of performing the electromagnetic forming. Thus, the rotating body A can easily be assembled and manufactured.

The embodiment of the present disclosure has been described above with reference to the attached drawings, but, needless to say, the present disclosure is not limited to the embodiment. It is apparent that those skilled in the art may arrive at various alternations and modifications within the scope of claims, and those examples are construed as naturally falling within the technical scope of the present disclosure.

For example, configurations of the embodiment and modification examples described above may be combined.

Moreover, in the embodiment and modification examples described above, description is made of the case in which the blades 21 include the long blades 21a and the short blades 21b. However, the blades 21 may have one kind of length in the axial direction.

INDUSTRIAL APPLICABILITY

The present disclosure is applicable to a rotating body including a compressor impeller and a shaft, to a turbocharger including the rotating body, and to a manufacturing method for a rotating body.

What is claimed is:
1. A rotating body, comprising:
 a shaft; and
 a compressor impeller including:
  a main body having an insertion hole, the insertion hole extending from a first end of the main body to a second end of the main body and being configured to receive the shaft inserted therethrough;
  a boss portion formed at a first end side of the main body; and
  a joint portion which is formed on an inner peripheral surface of the insertion hole at the boss portion, and is welded to the shaft
 wherein the insertion hole includes:
  a smaller-inner-diameter portion formed on a second end side with respect to the boss portion, and
  a radially expanded portion, which is located between the smaller-inner-diameter portion and the joint portion, and has an inner diameter larger than an inner diameter of the smaller-inner-diameter portion,
  the radially expanded portion is located inside the boss portion.
2. The rotating body according to claim 1, wherein the compressor impeller includes:
 blades which are provided at a second end side with respect to the boss portion on an outer periphery of the main body; and
 an extending portion, which is located between the blades and the boss portion and has a thickness in a radial direction larger than that of the boss portion.
3. The rotating body according to claim 2, wherein the shaft includes:
 a small-diameter portion welded to the joint portion;
 a large-diameter portion which is formed on the second end side with respect to the small-diameter portion, and has a diameter larger than that of the small-diameter portion; and
 a step portion extending from the small-diameter portion to the large-diameter portion.
4. The rotating body according to claim 3, wherein the boss portion is divided into a plurality of segments in a circumferential direction.
5. The rotating body according to claim 2, wherein the boss portion is divided into a plurality of segments in a circumferential direction.
6. The rotating body according to claim 1, wherein the shaft includes:
 a small-diameter portion welded to the joint portion;
 a large-diameter portion which is formed on a second end side with respect to the small-diameter portion, and has a diameter larger than that of the small-diameter portion; and
 a step portion extending from the small-diameter portion to the large-diameter portion.
7. The rotating body according to claim 6, wherein the boss portion is divided into a plurality of segments in a circumferential direction.
8. The rotating body according to claim 1, wherein the boss portion is divided into a plurality of segments in a circumferential direction.

9. A turbocharger, comprising the rotating body of claim 1.

10. The rotating body according to claim 1, wherein the shaft is free of a nut for fastening the compressor impeller to the shaft.

11. A manufacturing method for a rotating body, comprising:
- inserting a shaft through an insertion hole extending from a first end to a second end of a main body of a compressor impeller; and
- joining a boss portion, which is formed at the first end of the main body, and the shaft by electromagnetic forming,
- wherein the insertion hole includes:
  - a smaller-inner-diameter portion formed on a second end side with respect to the boss portion, and
  - a radially expanded portion, which is located between the smaller-inner-diameter portion and the joint portion, and has an inner diameter larger than an inner diameter of the smaller-inner-diameter portion,
  - the radially expanded portion is located inside the boss portion.

12. The method according to claim 11, wherein the shaft is free of a nut for fastening the compressor impeller to the shaft.

* * * * *